(12) United States Patent
Masuda et al.

(10) Patent No.: US 7,715,348 B2
(45) Date of Patent: May 11, 2010

(54) RADIO CONTROL DEVICE AND METHOD OF SELECTING SPREAD CODE

(75) Inventors: Masafumi Masuda, Yokosuka (JP); Kazunori Obata, Yokosuka (JP); Yutaka Ohto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1347 days.

(21) Appl. No.: 10/758,227

(22) Filed: Jan. 16, 2004

(65) Prior Publication Data

US 2004/0213186 A1    Oct. 28, 2004

(30) Foreign Application Priority Data

Jan. 16, 2003    (JP)    ............................ P2003-008754

(51) Int. Cl.
*H04B 7/216*    (2006.01)
*H04B 1/00*    (2006.01)

(52) U.S. Cl. ........................ 370/335; 370/342; 375/145; 375/149

(58) Field of Classification Search ......... 455/436–440, 455/450, 451, 452.1, 452.2, 455, 509, 516, 455/517, 62, 62.3; 370/329–331, 335, 342; 345/142, 144, 145, 148–150, 260, 343
See application file for complete search history.

(56) References Cited

U.S. PATENT DOCUMENTS

| | | | | |
|---|---|---|---|---|
| 5,953,326 | A * | 9/1999 | Nakamura et al. | 370/335 |
| 6,778,812 | B1 * | 8/2004 | Zhang | 455/67.13 |
| 6,804,214 | B1 * | 10/2004 | Lundh et al. | 370/335 |
| 7,003,269 | B2 * | 2/2006 | Willenegger | 455/102 |
| 7,106,708 | B2 * | 9/2006 | Lu | 370/329 |
| 2002/0114289 | A1 * | 8/2002 | Ishikawa et al. | 370/320 |
| 2002/0176438 | A1 * | 11/2002 | Karjalainen | 370/441 |
| 2003/0043774 | A1 * | 3/2003 | Hamalainen et al. | 370/342 |
| 2003/0123529 | A1 * | 7/2003 | Takano | 375/148 |
| 2004/0203823 | A1 * | 10/2004 | Harris | 455/452.1 |

FOREIGN PATENT DOCUMENTS

| | | |
|---|---|---|
| EP | 0 989 686 A2 | 3/2000 |
| JP | 7-23447 | 1/1995 |
| JP | 9-261726 | 10/1997 |
| JP | 2000-174662 | 6/2000 |
| JP | 2001-508625 A | 6/2001 |
| KR | 2001-0016706 | 3/2001 |
| WO | WO 98/32262 | 7/1998 |

* cited by examiner

*Primary Examiner*—George Eng
*Assistant Examiner*—Nam Huynh
(74) *Attorney, Agent, or Firm*—Oblon, Spivak, McClelland, Maier & Neustadt, L.L.P

(57) ABSTRACT

The object of the invention is to prevent reduction of the system capacity caused by the use of a channelization code belonging to the secondary scrambling code. Instead of trying to select a channelization code belonging to each of the primary and secondary scrambling codes for one cell in a conventional manner, selection of a channelization code belonging to the primary scrambling code is tried sequentially for a plurality of cells (S02, S04). If the selection of the code has been failed, it is determined whether selection is tried again under a different condition (S06). Then, when trying again, selection of a channelization code belonging to the secondary scrambling code is tried sequentially for the plurality of cells (S07, S09).

11 Claims, 3 Drawing Sheets

RADIO CONTROL DEVICE AND METHOD OF SELECTING SPREAD CODE

BACKGROUND OF THE INVENTION

1. Field of the Invention

This invention relates to a method of selecting a spread code in a radio communication system where multiple radio access using spectrum spread is made between a mobile station and a base station and a plurality of cells with different frequency bands exist at the same location, and relates to a radio control device for controlling a plurality of base stations forming a plurality of cells in the radio communication system.

2. Related Background Art

A typical example of a mobile radio communication system where multiple radio access is made using spectrum spread is the W-CDMA (Wideband—Code Division Multiple Access) system in IMT-2000 (International Mobile Telecommunications-2000). In the downlink communication of the W-CDMA system, a cell is identified by a spread code called scrambling code, and a channel is identified by a spread code called channelization code subsidiary to the scrambling code. The spread is a double spread based on these two codes. In addition, channelization codes subsidiary to the same scrambling code can be generated by a rule called OVSF (Orthogonal Variable Spreading Factor), and the orthogonality as OVSF is maintained if there is no time shift. On the other hand, channelization codes subsidiary to different scrambling codes have a correlation with each other regardless of time shift.

Although there is typically one scrambling code for each cell, a method of assigning a plurality of different scrambling codes to the same cell has been devised in order to expand the channelization code resource. Here, the first scrambling code is called "primary scrambling code", and the second and subsequent scrambling codes are called "secondary scrambling codes". In this situation, in general, channelization codes subsidiary to the primary scrambling code are preferentially selected, and only if they are no more available, channelization codes subsidiary to the secondary scrambling code are selected. This is because it is desirable to use channelization codes subsidiary to the same scrambling code as many as possible in order to prevent increase of interference components due to the correlation of the channelization codes and to attempt to secure the system capacity, since channelization codes subsidiary to different scrambling codes, as mentioned above, have a correlation with each other regardless of time shift.

Now, a plurality of frequency bands can be used by direct spread in the W-CDMA system. For example, if a frequency band f1 and a frequency band f2 exist, a cell of f1 and a cell of f2 can be used at the same location as overlaid distinct cells. Here, Japanese patent laid-open publication Heisei 7-23447 proposes the following control. When a mobile station which can use only f2 and a mobile station which can use both f1 and f2 are located together in the same service area, in order to reserve the channelization code resource of f2 for the mobile station which can use only f2, the mobile station which can use both f1 and f2 is allowed to select preferentially channelization codes of the cell of f1, and only when they are no more available, select channelization codes of the cell of f2.

As a method of carrying out such control, a method as shown in FIG. 3 can be contemplated. First, a radio resource selection unit for frequency band f1 tries to select a channelization code belonging to the primary scrambling code of f1 (S31, S32). If the selection has been successful, the selected channelization code is outputted (S40). Otherwise, if the selection has been failed, the same radio resource selection unit for frequency band f1 tries to select a channelization code belonging to the secondary scrambling code of f1 (S33, S34). If the selection has been failed here again, a radio resource selection unit for frequency band f2, in the same way as described above, tries to select a channelization code belonging to the primary scrambling code of f2 (S35, S36) and tries to select a channelization code belonging to the secondary scrambling code of f2 (S37, S38). Nevertheless if the selection has been failed, information indicating "selectable channelization code not found" is outputted (S39).

SUMMARY OF THE INVENTION

However, in this method shown in FIG. 3, since the selection trial of a channelization code belonging to the secondary scrambling code of frequency band f1 (S33) is carried out before the selection trial of a channelization code belonging to the primary scrambling code of frequency band f2 (S35), channelization codes belonging to the secondary scrambling code are selected more frequently in the cell of frequency band f1. For this reason, interference components between channelization codes belonging to the primary scrambling code and channelization codes belonging to the secondary scrambling code may increase in the cell of frequency band f1, and thus the capacity of the cell of frequency band f1 will be reduced, which may cause the overall system capacity to be reduced.

The present invention has been made in view of the above-mentioned problem. An object of the invention is to provide a radio control device and a method of selecting a spread code which can prevent reduction of the system capacity due to the use of channelization codes belonging to the secondary scrambling code.

In order to achieve the above-mentioned object, a radio control device according to the present invention is, in a radio communication system where multiple radio access using spectrum spread is made between a mobile station and a base station and a plurality of cells with different frequency bands exist at the same location, a radio control device for controlling a plurality of base stations forming the plurality of cells, comprising: code selection trial means for each cell, provided in association with each of the plurality of cells, for trying to select a spread code for the associated cell under a predetermined condition; determination means for determining whether to try to select a spread code again under a different condition from the condition that has been used in the selection trial, when the selection trial of the spread code by each code selection trial means under the predetermined condition has been terminated without any successful selection of the spread code; and control means for controlling the code selection trial means and the determination means so as to cause the code selection trial means to try to select the spread code sequentially for the plurality of cells under the predetermined condition, cause the determination means to determine whether to try to select the spread code again under the different condition from the condition that has been used in the selection, after the termination of the selection trial by each code selection trial means, and cause the code selection trial means to try to select the spread code sequentially for the plurality of cells under the different condition when it has been determined that the selection should be tried again.

Namely, the radio control device according to the present invention is provided in a radio communication system where multiple radio access using spectrum spread is made between a mobile station and a base station and a plurality of cells with different frequency bands exist at the same location. In addition to the code selection trial means for each cell that is provided in association with each of the plurality of cells, this radio control device comprises determination means and control means which have not conventionally existed, and the following operations are carried out under the control of the control means. First, the code selection trial means tries to select a spread code sequentially for the plurality of cells under a predetermined condition. Namely, the selection of the spread code is not tried for one cell under a plurality of conditions in a conventional manner, but the selection of the spread code is tried sequentially for the plurality of cells under the predetermined condition. Then, when the selection trial of the spread code by each code selection trial means has been terminated without any successful selection of the spread code, the determination means determines whether to try to select a spread code again under a different condition from the condition that has been used in the selection. Here, when it has been determined that the selection should be tried again, the code selection trial means tries to select a spread code sequentially for the plurality of cells under the different condition. In the above determination, it may be determined that the selection is always tried again if the selection of the spread code has been failed, or it may be determined that the selection is not tried again in order to completely avoid the interference caused by the use of spread codes for one cell under the plurality of conditions.

As mentioned above, instead of trying to select a spread code for one cell under a plurality of conditions in a conventional manner, the code selection trial means tries to select a spread code sequentially for a plurality of cells under a predetermined condition. When the determination means determines that the selection of the spread code should be tried again under a different condition, selection of the spread code is tried under the different condition. This can prevent a situation where interference components are increased and the capacity of the cell is reduced by the use of spread codes for one cell under a plurality of conditions (for example, both the channelization code belonging to the primary scrambling code and the channelization code belonging to the secondary scrambling code are used for one cell). As a result, reduction of the system capacity can be prevented. In addition, according to the present invention, the probability of selecting spread codes for different cells may be increased. However, interference between the selected spread codes for the different cells does not matter because the frequency bands differ between the different cells.

More specifically, each cell of the radio communication system is associated with a plurality of spread code trees generated by OVSF, and the different condition is associated with a selection trial from a spread code tree different from the spread code tree that has already been used in the selection trial.

The invention related to the above-mentioned radio control device can also be described as an invention related to a method of selecting a spread code. Namely, the method of selecting a spread code according to the present invention is a method of selecting a spread code in a radio communication system where multiple radio access using spectrum spread is made between a mobile station and a base station and a plurality of cells with different frequency bands exist at the same location, comprising: trying to select a spread code sequentially for the plurality of cells under a predetermined condition; determining whether to try to select a spread code again under a different condition from the condition that has been used in the selection, when the selection trial for each cell has been terminated without any successful selection of the spread code; and trying to select the spread code sequentially for the plurality of cells under the different condition when it has been determined that the selection should be tried again.

By carrying out such a method of selecting a spread code, instead of trying to select a spread code for one cell under a plurality of conditions in a conventional manner, selection of a spread code is tried sequentially for a plurality of cells under a predetermined condition. When it is determined that the selection of the spread code should be tried again under a different condition, selection of the spread code is tried under the different condition. This can prevent a situation where interference components are increased and the capacity of the cell is reduced by the use of spread codes for one cell under a plurality of conditions (for example, both the channelization code belonging to the primary scrambling code and the channelization code belonging to the secondary scrambling code are used for one cell). As a result, reduction of the system capacity can be prevented.

DESCRIPTION OF THE PREFERRED EMBODIMENTS

An embodiment according to the present invention will now be described.

Figure 1:
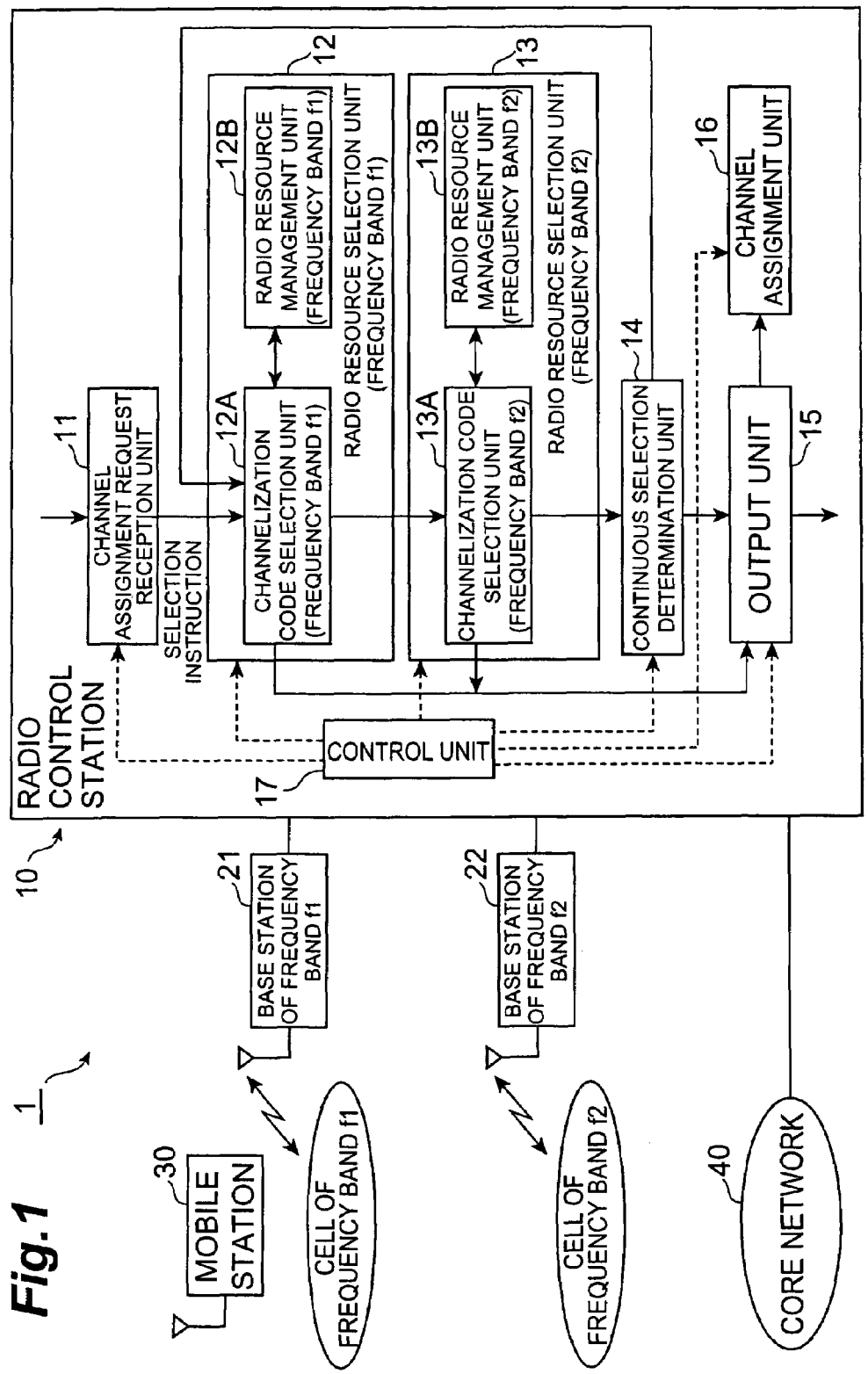
FIG. 1 is a view of the configuration of a radio communication system according to an embodiment of the invention.

FIG. 1 shows a view of the configuration of a radio communication system 1 according to the present embodiment. As shown in this figure, the radio communication system 1 includes a base station 21 of frequency band F1, a base station 22 of frequency band f2, and a radio control station 10 that is connected to a core network 40 and controls the above-mentioned base stations 21 and 22. A cell of frequency band f1 formed by the base station 21 and a cell of frequency band f2 formed by the base station 22 are overlapped in the same area, in which a mobile station 30 is located. Although the mobile station 30, the cell and the base station 21, 22 which use each frequency band, and the radio control station 10 each appear once in FIG. 1, in general, more than one for each are located in the service area.

The radio control station 10 comprises a channel assignment request reception unit 11 for receiving a channel assignment request, a radio resource selection unit 12 for selecting radio resource (for example, channelization codes and the like as described later) for frequency band F1, a radio resource selection unit 13 for selecting radio resource for frequency band f2, a continuous selection determination unit 14 for determining whether selection should be made continuously in the processing described later, an output unit 15 for outputting a message indicating unavailable selection and the like, a channel assignment unit 16 for assigning channels, and a control unit 17 for carrying out operation control and status monitoring of each of the above-mentioned units.

The radio resource selection unit 12 comprises a channelization code selection unit 12A for trying to select a channelization code belonging to frequency band F1, and a radio resource management unit 12B for controlling the usage condition and the like of channelization codes belonging to frequency band f1. In the same way, the radio resource selection unit 13 comprises a channelization code selection unit 13A for trying to select a channelization code belonging to frequency band f2, and a radio resource management unit 13B for controlling the usage condition and the like of channelization codes belonging to frequency band f2.

In the description of the internal configuration of the radio control station 10 in FIG. 1, a solid arrow represents a linkage of processing and an instruction signal related to the linkage of processing, and a dashed arrow represents a control/monitoring signal produced by the control unit 17.

Next, in accordance with a flow chart of FIG. 2, the processing in the radio control station 10 will be described. First, in the radio control station 10, when the channel assignment request reception unit 11 receives a channel assignment request (S01 in FIG. 2), the selection instruction signal for a channelization code is transmitted to the radio resource selection unit 12 for frequency band F1, and the channelization code selection unit 12A tries to select a channelization code belonging to the primary scrambling code in the cell of frequency band f1 (S02). At this time, the channelization code selection unit 12A inquires of the radio resource management unit 12B about the usage condition of channelization codes belonging to the primary scrambling code of frequency band f1. If the channelization code is unused, the channelization code is selected. If the channelization code is in use, the channelization code is not selected.

If the selection has been successful in the selection trial at S02, the information of the selected channelization code is outputted by the output unit 15 (S12), and the channel assignment unit 16 assigns a channel based on the selected channelization code (S13). The processing of FIG. 2 is then terminated.

On the other hand, if the selection has been failed in the selection trial at S02 as described above, the flow then proceeds to S04, where an instruction signal is transmitted to the other radio resource selection unit 13, and the channelization code selection unit 13A tries to select a channelization code belonging to the primary scrambling code in the cell of frequency band f2. At this time, the channelization code selection unit 13A inquires of the radio resource management unit 13B about the usage condition of channelization codes belonging to the primary scrambling code of frequency band f2. If the channelization code is unused, the channelization code is selected. If the channelization code is in use, the channelization code is not selected.

If the selection has been successful in the selection trial at S04 as described above, the information of the selected channelization code is outputted by the output unit 15 (S12), and the channel assignment unit 16 assigns a channel based on the selected channelization code (S13). The processing of FIG. 2 is then terminated.

On the other hand, if the selection has been failed in the selection trial at S04, the flow then proceeds to S06, and the continuous selection determination unit 14 determines whether the selection trial of a channelization code should be carried out again. In this determination, it may be determined that the selection is always tried again, or it may be determined that the selection is not tried again in order to completely avoid the interference caused by the use of both the channelization code belonging to the primary scrambling code and the channelization code belonging to the secondary scrambling code for one cell.

Figure 2:
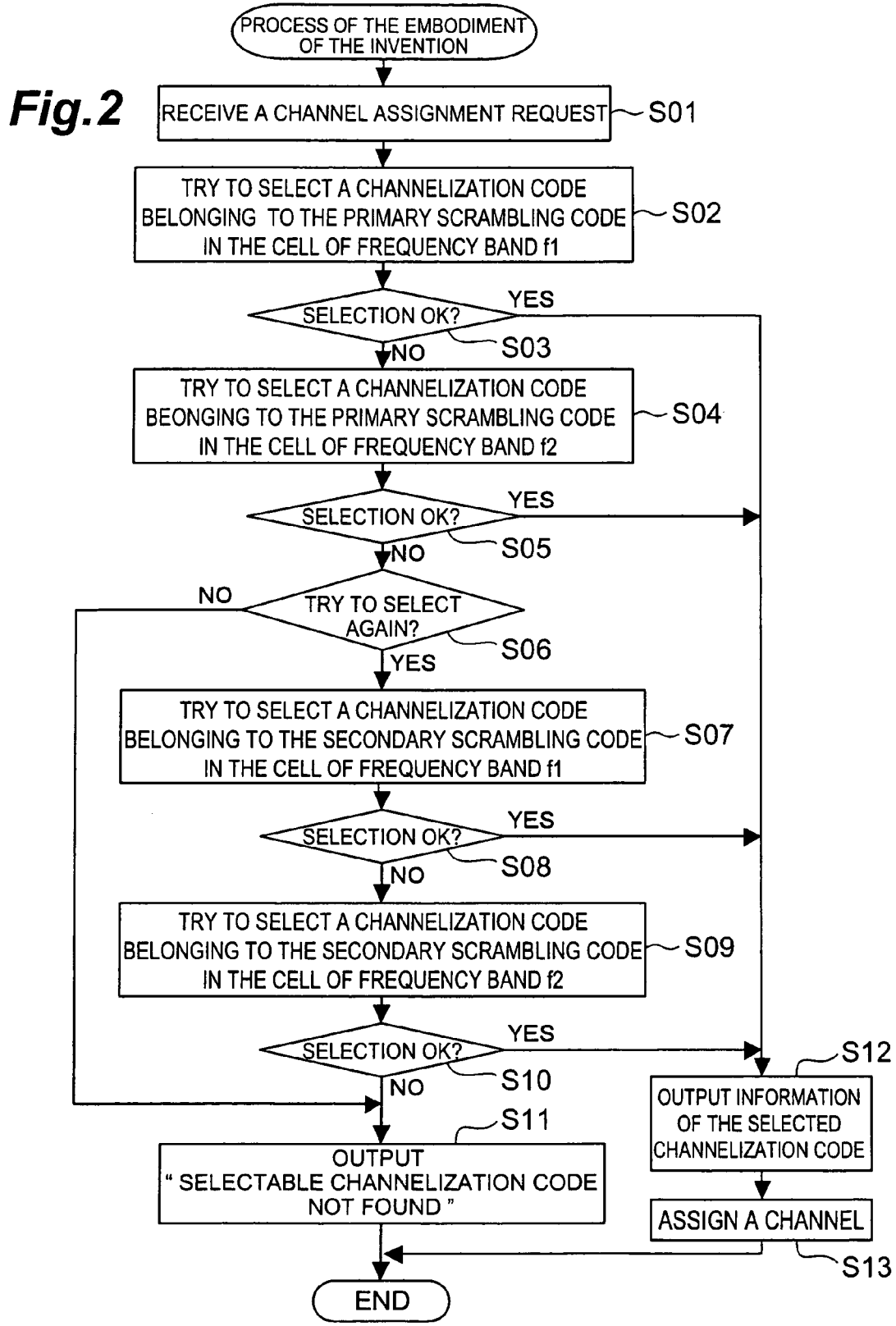
FIG. 2 is a flow chart showing the process in the radio control station.
Figure 3:
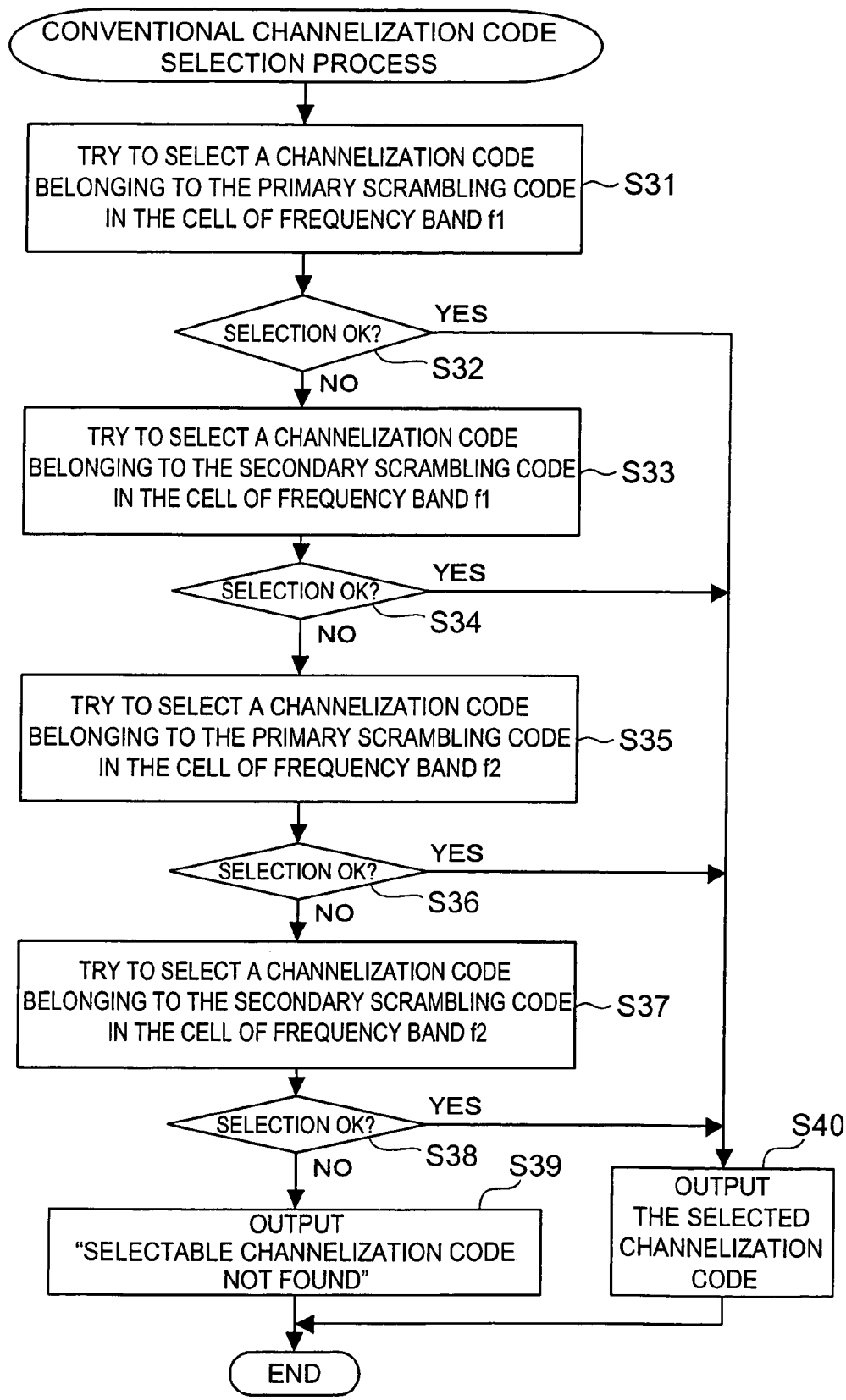
FIG. 3 is a flow chart showing a conventional channelization code selection process.

If it has been determined at S06 that the selection is not tried again, a message indicating "selectable channelization code not found" is outputted by the output unit 15 (S11), and the processing of FIG. 2 is terminated.

On the other hand, if it has been determined at S06 that the selection is tried again, a selection instruction signal for a channelization code is transmitted to the radio resource selection unit 12 from the continuous selection determination unit 14, and the channelization code selection unit 12A tries to select a channelization code belonging to the secondary scrambling code in the cell of frequency band f1 (S07). At this time, the channelization code selection unit 12A inquires of the radio resource management unit 12B about the usage condition of channelization codes belonging to the secondary scrambling code of frequency band f1. If the channelization code is unused, the channelization code is selected. If the channelization code is in use, the channelization code is not selected.

If the selection has been successful in the selection trial at S07 as described above, the information of the selected channelization code is outputted by the output unit 15 (S12), and the channel assignment unit 16 assigns a channel based on the selected channelization code (S13). The processing of FIG. 2 is then terminated.

On the other hand, if the selection has been failed in the selection trial at S07, the flow then proceeds to S09, where an instruction signal is transmitted to the other radio resource selection unit 13, and the channelization code selection unit 13A tries to select a channelization code belonging to the secondary scrambling code in the cell of frequency band f2. At this time, the channelization code selection unit 13A inquires of the radio resource management unit 13B about the usage condition of channelization codes belonging to the secondary scrambling code of frequency band f2. If the channelization code is unused, the channelization code is selected. If the channelization code is in use, the channelization code is not selected.

If the selection has been successful in the selection trial at S09 as described above, the information of the selected channelization code is outputted by the output unit 15 (S12), and the channel assignment unit 16 assigns a channel based on the selected channelization code (S13). The processing of FIG. 2 is then terminated.

On the other hand, if the selection has been failed in the selection trial at S09, a message indicating "selectable channelization code not found" is outputted by the output unit 15 (S11), and the processing of FIG. 2 is terminated.

As described above, the processing in FIG. 2 allows channelization codes belonging to the primary scrambling code to be preferentially selected across the cells of all frequency bands. This can prevent a situation where interference components are increased and the capacity of the cell is reduced by the use of both the channelization code belonging to the primary scrambling code and the channelization code belonging to the secondary scrambling code. As a result, reduction of the system capacity can be prevented.

Although the case of two frequency bands f1 and f2 has been described as an example in the above embodiment, the same applies to the case where three or more frequency bands are used. Moreover, although the case has been described by way of example where the frequency band f1 has a higher preference than the frequency band f2, the same applies to the case where, to the contrary, the frequency band f2 has a higher preference than the frequency band f1.

Moreover, although an application to a radio communication system including a plurality of cells has been described above, the present invention is applicable not only to cells but also to sectors.

As described above, according to the present invention, instead of trying to select a spread code for one cell under a plurality of conditions in a conventional manner, selection of a spread code is tried sequentially for a plurality of cells under a predetermined condition. When it is determined that the selection of the spread code should be tried again under a different condition, selection of the spread code is tried under the different condition. This can prevent a situation where interference components are increased and the capacity of the cell is reduced by the use of spread codes for one cell under a plurality of conditions (for example, both the channelization code belonging to the primary scrambling code and the channelization code belonging to the secondary scrambling code are used for one cell). As a result, reduction of the system capacity can be prevented.

What is claimed is:

1. A radio control device for controlling a plurality of base stations, comprising:
   a channel assignment request reception unit configured to receive a channel assignment request;
   a first channelization code selection unit configured to select a first channelization code for a mobile station for a first frequency, based on a scrambling code of the first frequency;
   a second channelization code selection unit configured to select a second channelization code for the mobile station for a second frequency, based on a scrambling code of the second frequency;
   an assignment unit configured to assign the channelization code selected by either the first or second channelization code selection unit to the mobile station; and
   a control unit configured to control the first and second channelization code selection units, the control unit configured to
      (a) instruct the first channelization code selection unit to use a primary scrambling code belonging to the first frequency to look for an unused channelization code,
      (b) instruct the second channelization code selection unit to use a primary scrambling code belonging to the second frequency to look for an unused channelization code, in a case the first channelization code selection unit has determined that there is no unused channelization code for the primary scrambling code for the first frequency, and
      (c) instruct the first channelization code selection unit to use a secondary scrambling code belonging to the first frequency to look for an unused channelization code, in a case the second channelization code selection unit has determined that there is no unused channelization code for the primary scrambling code for the second frequency.

2. The radio control device according to claim 1, wherein the control unit is further configured to
   (d) instruct the second channelization code selection unit to use a secondary scrambling code belonging to the second frequency to look for an unused channelization code, in a case the first channelization code selection unit has determined that there is no unused channelization code for the secondary scrambling code for the first frequency.

3. The radio control device according to claim 1, wherein the control unit sequentially performs the steps (a), (b) and (c), and in a case the unused channelization code is found by either the first or second channelization code selection units, the control unit stops instructing the first and second channelization code selection units to look for a channelization code, and
   the assignment unit assigns the unused channelization code found by either the first or second channelization code selection unit.

4. The radio control device according to claim 1, wherein the first and second frequencies are associated with a first and second channelization code trees forming first and second channelization code sets generated by Orthogonal Variable Spreading Factor (OVSF), and the first and second channelization codes are part of the first and second channelization code sets, respectively.

5. A radio control device for controlling a plurality of base stations, comprising:
   channel assignment request reception means for receiving a channel assignment request;
   first channelization code selection means for selecting a first channelization code for a mobile station means for a first frequency, based on a scrambling code of the first frequency;
   second channelization code selection means for selecting a second channelization code for the mobile station means for a second frequency, based on a scrambling code of the second frequency;
   assignment means for assigning the channelization code selected by either the first or second channelization code selection means to the mobile station means; and
   control means for controlling the first and second channelization code selection means, the control means
      (a) instructing the first channelization code selection means to use a primary scrambling code belonging to the first frequency to look for an unused channelization code,
      (b) instructing the second channelization code selection means to use a primary scrambling code belonging to the second frequency to look for an unused channelization code, in a case the first channelization code selection means has determined that there is no unused channelization code for the primary scrambling code for the first frequency, and
      (c) instructing the first channelization code selection means to use a secondary scrambling code belonging to the first frequency to look for an unused channelization code, in a case the second channelization code selection means has determined that there is no unused channelization code for the primary scrambling code for the second frequency.

6. The radio control device according to claim 5, wherein the control means is further
   (d) instructing the second channelization code selection means to use a secondary scrambling code belonging to the second frequency to look for an unused channelization code, in a case the first channelization code selection means has determined that there is no unused channelization code for the secondary scrambling code for the first frequency.

7. The radio control device according to claim 5, wherein the control means sequentially performs the steps (a), (b) and (c), and in a case the unused channelization code is found by either the first or second channelization code selection means, the control means stops instructing the first and second channelization code selection means to look for a channelization code, and
   the assignment means assigns the unused channelization code found by either the first or second channelization code selection means.

8. The radio control device according to claim 5, wherein the first and second frequencies are associated with a first and second channelization code trees forming first and second channelization code sets generated by Orthogonal Variable Spreading Factor (OVSF), and the first and second channelization codes are part of the first and second channelization code sets, respectively.

9. A radio control method for controlling a plurality of base stations, the method performed on radio control device, comprising the steps of:
  (a) receiving a channel assignment request;
  (b) instructing a first channelization code selection unit by a control unit to use a primary scrambling code belonging to a first frequency to look for an unused channelization code;
  (c) instructing a second channelization code selection unit by the control unit to use a primary scrambling code belonging to a second frequency to look for an unused channelization code, in a case said step (b) has determined that there is no unused channelization code for the primary scrambling code for the first frequency;
  (d) instructing the first channelization code selection unit by the control unit to use a secondary scrambling code belonging to the first frequency to look for an unused channelization code, in a case said step (c) has determined that there is no unused channelization code for the primary scrambling code for the second frequency; and
  (e) assigning the channelization code that was found by either the first or second channelization code selection units to a mobile station.

10. The radio control method according to claim 9, further comprising the step of:
  (f) instructing the second channelization code selection unit by the control unit to use a secondary scrambling code belonging to the second frequency to look for an unused channelization code, in a case said step (d) has determined that there is no unused channelization code for the secondary scrambling code for the first frequency.

11. The radio control device according to claim 9, wherein the control unit sequentially performs the steps (b), (c) and (d), the method further comprising the steps of:
  (g) ceasing instructing the first and second channelization code selection units to look for a channelization code, and
  (h) assigning the unused channelization code found by either the first or second channelization code selection unit, as soon as the unused channelization code is found.

* * * * *